(12) United States Patent
Hiraiwa et al.

(10) Patent No.: US 10,625,737 B2
(45) Date of Patent: Apr. 21, 2020

(54) DRIVING ASSIST APPARATUS AND DRIVING ASSIST SYSTEM

(71) Applicant: TOYOTA JIDOSHA KABUSHIKI KAISHA, Toyota-shi, Aichi-ken (JP)

(72) Inventors: Yuta Hiraiwa, Toyota (JP); Yuma Hoshikawa, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 206 days.

(21) Appl. No.: 15/881,107

(22) Filed: Jan. 26, 2018

(65) Prior Publication Data

US 2018/0222474 A1    Aug. 9, 2018

(30) Foreign Application Priority Data

Feb. 3, 2017   (JP) .................... 2017-018419

(51) Int. Cl.
| | | |
|---|---|---|
| *B60W 30/09* | (2012.01) | |
| *B60W 10/20* | (2006.01) | |
| *B60W 50/14* | (2020.01) | |
| *B60W 10/184* | (2012.01) | |

(52) U.S. Cl.
CPC ............ *B60W 30/09* (2013.01); *B60W 10/20* (2013.01); *B60W 50/14* (2013.01); *B60W 10/184* (2013.01); *B60W 2050/146* (2013.01); *B60W 2520/10* (2013.01); *B60W 2540/18* (2013.01); *B60W 2550/10* (2013.01); *B60W 2550/20* (2013.01); *B60W 2720/10* (2013.01); *B60W 2720/24* (2013.01)

(58) Field of Classification Search
CPC ...... B60W 30/09; B60W 10/20; B60W 50/14; B60W 10/184; B60W 2050/146; B60W 2520/10; B60W 2540/18; B60W 2550/10; B60W 2550/20; B60W 2720/10; B60W 2720/24
USPC .......................................................... 701/41
See application file for complete search history.

(56) References Cited

U.S. PATENT DOCUMENTS 9,452,754 B2 *  9/2016  Clarke ................. B60W 30/00
9,495,874 B1 *  11/2016 Zhu ........................ G06N 20/00
(Continued)

FOREIGN PATENT DOCUMENTS

| JP | 2000-067396 A | 3/2000 |
|---|---|---|
| JP | 2005-031967 A | 2/2005 |
| JP | 2016-113092 A | 6/2016 |

*Primary Examiner* — Yazan A Soofi
(74) *Attorney, Agent, or Firm* — Oliff PLC

(57) ABSTRACT

A driving assist apparatus includes at least one electronic control unit. The at least one electronic control unit is configured to: detect a first object and assist a collision avoidance between a vehicle and the first object existing in a traveling direction of the vehicle; determine whether a first condition that a predetermined number or more of physical objects are detected is satisfied; determine whether a second condition that the vehicle travels at a predetermined speed or lower is satisfied; determine whether a third condition that a predetermined number or more of turning operations of a steering wheel of the vehicle are performed in a predetermined time is satisfied; and determine that a road on which the vehicle is traveling is a crowded environment road, based on a determination that all of the first to third conditions are satisfied.

7 Claims, 5 Drawing Sheets

(56) References Cited

U.S. PATENT DOCUMENTS

| | | | |
|---|---|---|---|
| 2014/0032093 A1* | 1/2014 | Mills | B60W 40/107 701/301 |
| 2014/0120804 A1* | 5/2014 | Duescher | B24B 37/30 451/28 |
| 2017/0120804 A1* | 5/2017 | Kentley | G05D 1/0088 |
| 2017/0124476 A1* | 5/2017 | Levinson | G05D 1/0088 |
| 2018/0148063 A1* | 5/2018 | Tatsushiro | B60K 6/365 |

* cited by examiner

DRIVING ASSIST APPARATUS AND DRIVING ASSIST SYSTEM

INCORPORATION BY REFERENCE

The disclosure of Japanese Patent Application No. 2017-018419 filed on Feb. 3, 2017 including the specification, drawings and abstract is incorporated herein by reference in its entirety.

BACKGROUND

1. Technical Field

The disclosure relates to a driving assist apparatus and a driving assist system.

2. Description of Related Art

For example, Japanese Patent Application Publication No. 2005-031967 discloses a driving assist apparatus that detects a physical object (a preceding vehicle, a parked vehicle, a road installation, a pedestrian or the like) existing in front of a vehicle and assists a collision avoidance between the vehicle and the physical object.

SUMMARY

On a road on which the periphery of a vehicle is crowded with a plurality of physical objects (hereinafter, referred to as a "crowded environment road"), as exemplified by a narrow-width road on which road installations are and a road on which many pedestrians are by the roadside, it is determined that the risk of the collision with the vehicle is high for many physical objects, and therefore, a collision avoidance assist is likely to be frequently activated in the driving assist apparatus.

However, in such a crowded environment road, for example, as shown in FIG. 5, if a driver is willing to perform danger avoidance, the driver is expected to drive while paying attention to the periphery, by decelerating the vehicle, steering the vehicle right and left or keeping distances from pedestrians (A and B). Therefore, when an activation determination is performed on the crowded environment road similarly to ordinary roads (a road that has a wide width, a road on which few pedestrians are by the roadside, and the like) so that the collision avoidance assist is frequently activated, there is a concern that the collision avoidance assist gives annoyance to the driver who is willing to perform the danger avoidance.

As a measure for suppressing the annoyance, for example, it is conceivable to perform a control such that, on the crowded environment road, it is harder to activate the collision avoidance assist than on ordinary roads. However, in the related art, whether the road on which the vehicle is traveling is a crowded environment road is not determined.

The disclosure provides a driving assist apparatus that can determine whether the road on which the vehicle is traveling is a road that is crowded with a plurality of physical objects.

An first aspect of the disclosure provides a driving assist apparatus. The driving assist apparatus according to the first aspect includes at least one electronic control unit. The at least one electronic control unit is configured to detect a first object and assists a collision avoidance between a vehicle and the first object existing in a traveling direction of the vehicle. The at least one electronic control unit is configured to determine whether a first condition is satisfied. The first condition is a condition that a predetermined number or more of physical objects are detected. The at least one electronic control unit is configured to determine whether a second condition is satisfied. The second condition is a condition that the vehicle travels at a predetermined speed or lower. The at least one electronic control unit is configured to determine whether a third condition is satisfied. The third condition is a condition that a predetermined number or more of turning operations of a steering wheel of the vehicle are performed in a predetermined time. Each of the turning operations of the steering wheel of the vehicle is a turning operation by which the steering wheel is turned by a predetermined rotational angle or more. The at least one electronic control unit is configured to determine that a road on which the vehicle is traveling is a crowded environment road, based on a determination that all of the first condition, the second condition, and the third condition are satisfied. The crowded environment road is a road crowded with the physical objects.

In the aspect, the number (first condition) of physical objects existing in the traveling direction of the vehicle, which allows an estimation of whether a road and the periphery of the road are crowded with a plurality of physical objects, is determined. In addition, the decrease (second condition) in the traveling speed of the vehicle and the number (third condition) of the turning operations of the steering wheel, which are actions likely to be performed by a driver on the road crowded with a plurality of physical objects, are determined. By the determinations, it is possible to accurately determine whether the road on which the vehicle is traveling is a road that is crowded with a plurality of physical objects.

In the first aspect, the at least one electronic control unit may be configured to repeatedly execute the determination of whether the road on which the vehicle is traveling is the crowded environment road, at a predetermined interval, and may be configured not to execute the determination until a certain time elapses after a determination different from a previous determination is made.

According to the above configuration, it is possible to avoid the determination from switching frequently in a shorter time than the certain time, between a determination that the road on which the vehicle is traveling is a road that is crowded with a plurality of physical objects and a determination that the road on which the vehicle is traveling is a road that is not crowded with a plurality of physical objects.

In the first aspect, the at least one electronic control unit may be configured to, when the at least one electronic control unit determines that the road on which the vehicle is traveling is the crowded environment road, control the driving assist apparatus such that it is harder to activate the assist of the collision avoidance than when the at least one electronic control unit determines that the road on which the vehicle is traveling is not the crowded environment road.

In the first aspect, the at least one electronic control unit may be configured to predict a collision time until the vehicle collides with the first object, and may be configured to activate the assist of the collision avoidance when the collision time is a predetermined reference value or less. The at least one electronic control unit may be configured to add a predetermined offset time to the collision time, when the at least one electronic control unit determines that the road on which the vehicle is traveling is the crowded environment road.

In the first aspect, the at least one electronic control unit may be configured to measure a relative distance between the vehicle and the first object, and may be configured to activate the assist of the collision avoidance when the relative distance is a predetermined reference value or less. The at least one electronic control unit may be configured to add a predetermined offset distance to the relative distance, when the at least one electronic control unit determines that the road on which the vehicle is traveling is the crowded environment road.

According to the above configurations, there is no concern that, in a situation in which the driver is willing to perform danger avoidance on a road that is crowded with a plurality of physical objects, the activation determination is performed similarly to ordinary roads so that the collision avoidance assist is frequently activated and gives annoyance to the driver.

In the first aspect, the physical objects may exist in the traveling direction of the vehicle or in a periphery of the vehicle, on the road on which the vehicle is traveling.

A second aspect of the disclosure provides a driving assist system. The driving assist system according to the second aspect includes at least one electronic control unit. The at least one electronic control unit is configured to detect a first physical object and assist a collision avoidance between a vehicle and the first physical object existing in a traveling direction of the vehicle. The at least one electronic control unit is configured to determine whether a first condition is satisfied. The first condition is a condition that a total number of the detected first physical object and detected second physical objects is a predetermined number or more. The second physical objects exist in the traveling direction of the vehicle or in a periphery of the vehicle. The at least one electronic control unit is configured to determine whether a second condition is satisfied. The second condition is a condition that the vehicle travels at a predetermined speed or lower. The at least one electronic control unit is configured to determine whether a third condition is satisfied. The third condition is a condition that a predetermined number or more of turning operations of a steering wheel of the vehicle are performed in a predetermined time. Each of the turning operations of the steering wheel of the vehicle is a turning operation by which the steering wheel is turned by a predetermined rotational angle or more. The at least one electronic control unit is configured to determine that a road on which the vehicle is traveling is a crowded environment road, when the at least one electronic control unit determines that at least all of the first condition, the second condition, and the third condition are satisfied. The crowded environment road is a road crowded with the second physical objects. The at least one electronic control unit is configured to control the vehicle using a brake apparatus included in the vehicle, such that when the at least one electronic control unit determines that the road on which the vehicle is traveling is the crowded environment road, it is harder to activate the assist of the collision avoidance than when the at least one electronic control unit determines that the road on which the vehicle is traveling is not the crowded environment road.

According to the driving assist apparatus of the disclosure, it is possible to determine whether the road on which the vehicle is traveling is a road that is crowded with a plurality of physical objects.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

The embodiments provide a driving assist apparatus that detects a physical object existing in a traveling direction of a vehicle and assists a collision avoidance between the vehicle and the physical object. The driving assist device determines whether a road on which the vehicle is traveling is a road that is crowded with a plurality of physical objects, using three items: the number of physical objects in the traveling direction of the vehicle, the traveling speed of the vehicle, and the number of steering wheel turning operations by a driver. Thereby, it is possible to accurately determine whether the road on which the vehicle is traveling is a road that is crowded with a plurality of physical objects.

Configuration of Driving Assist Apparatus

Figure 1:
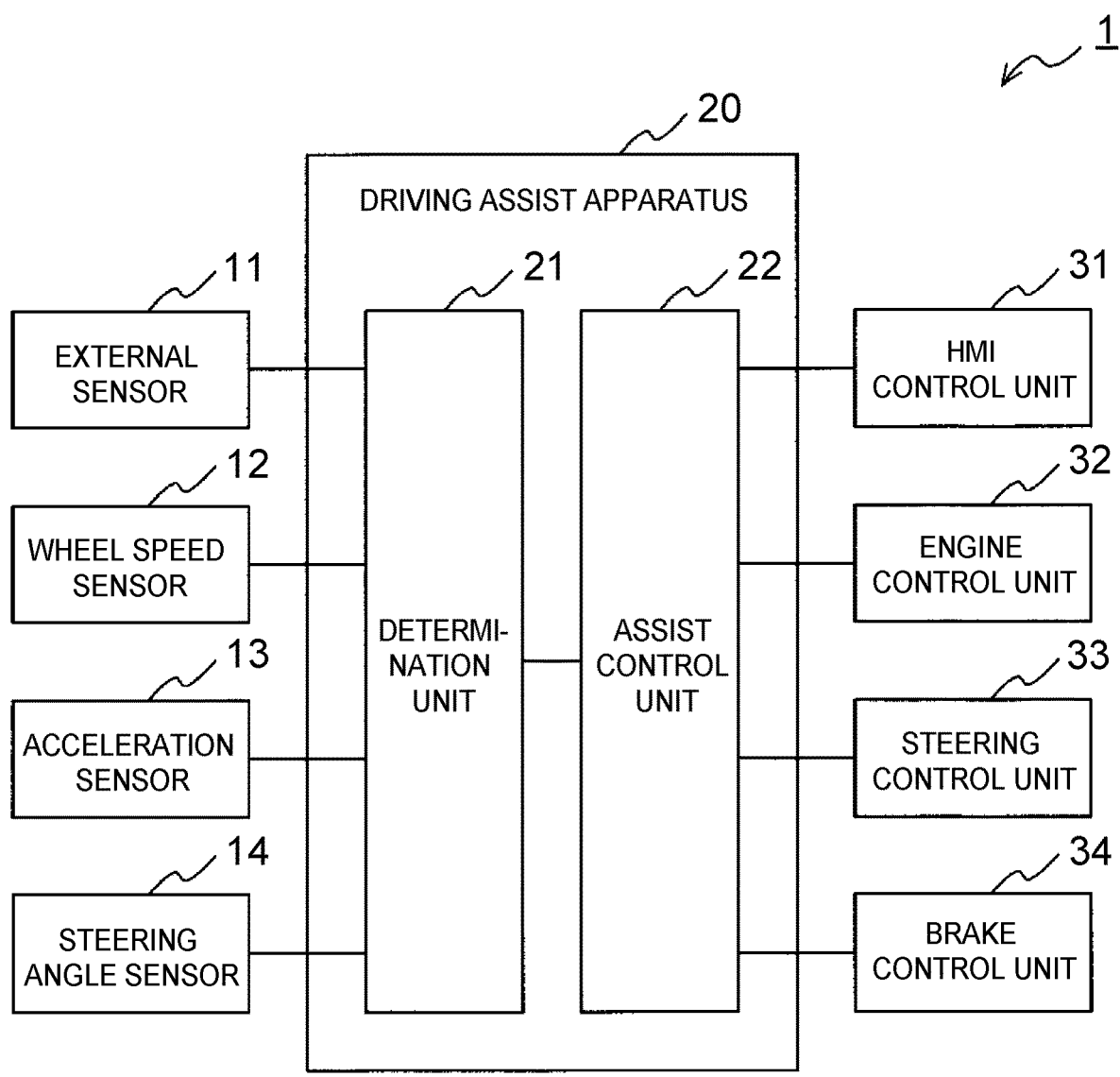
FIG. 1 is a diagram showing a schematic configuration of a driving assist apparatus according to an embodiment of the disclosure.

FIG. 1 is a diagram showing a schematic configuration of a vehicle system 1 including a driving assist apparatus 20 according to an embodiment of the disclosure. The vehicle system 1 illustrated in FIG. 1 is configured to include an external sensor 11, a wheel speed sensor 12, an acceleration sensor 13, a steering angle sensor 14, the driving assist apparatus 20 according to the embodiment, a HMI control unit 31, an engine control unit 32, a steering control unit 33, and a brake control unit 34.

The external sensor 11 is a sensor for detecting information about the exterior of the vehicle. Specifically, the external sensor 11, which is provided at a front part of the vehicle, detects mainly physical objects that exist in front of the vehicle, as exemplified by pedestrians, bicycles, other vehicles and road installations. As the external sensor 11, for example, a radar sensor using laser beams, millimeter waves, microwaves or ultrasonic waves, and a camera sensor using a CCD (Charge Coupled Device) or a CMOS (Complementary Metal Oxide Semiconductor) can be used. The information about the physical objects detected by the external sensor 11 is output to the driving assist apparatus 20.

The wheel speed sensor 12 is a sensor for detecting the rotational speed (or rotational amount) of a wheel. The wheel speed sensor 12 is provided at each wheel of the vehicle. Information of the rotational speed (or rotational amount) detected by the wheel speed sensor 12 is output to the driving assist apparatus 20.

The acceleration sensor 13, which is provided at a predetermined place of the vehicle, is a sensor for detecting the magnitude of an acceleration G that is given to the vehicle.

As the acceleration sensor 13, for example, a three-axis acceleration sensor that detects accelerations of the vehicle in the front-back direction, the vehicle width direction and the vertical direction can be used. Information of the acceleration detected by the acceleration sensor 13 is output to the driving assist apparatus 20.

The steering angle sensor 14 is a sensor for detecting a steering angle of a steering wheel that corresponds to a steering operation by the driver. For example, the steering angle sensor 14 is provided in the steering control unit 33 of the vehicle. Information of the steering angle detected by the steering angle sensor 14 is output to the driving assist apparatus 20.

The HMI (Human Machine Interface) control unit 31 is means capable of controlling presentation of information such as the activation state of a driving assist for the driver, in accordance with an instruction that is output from the driving assist apparatus 20. For the presentation of the information, for example, a device (not illustrated) such as a head-up display (HUD), a monitor of a navigation system, a meter panel and a speaker is used.

The engine control unit 32 is means capable of controlling the state of fuel supply to an internal combustion apparatus (not illustrated) such as an engine, for example, in accordance with an instruction that is output from the driving assist apparatus 20.

The steering control unit 33 is means capable of controlling a force for assisting the steering of the vehicle, for example, by an electric power steering mechanism (not illustrated), in accordance with an instruction that is output from the driving assist apparatus 20.

The brake control unit 34 is means capable of controlling a braking force that is automatically applied to wheels of the vehicle, for example, by an automatic brake mechanism (not illustrated), in accordance with an instruction that is output from the driving assist apparatus 20.

The driving assist apparatus 20 determines whether the road on which the vehicle is traveling is a road (physical object crowded road) that is crowded with a plurality of physical objects, based on the information about the vehicle, the information about the physical object, and the like that are acquired from the external sensor 11, the wheel speed sensor 12, the acceleration sensor 13 and the steering angle sensor 14.

When it is determined that the road on which the vehicle is traveling is a physical object crowded road, the driving assist apparatus 20, as necessary, can give an instruction of the activation of a driving assist control for collision avoidance, to at least one of the HMI control unit 31, the engine control unit 32, the steering control unit 33 and the brake control unit 34.

The driving assist apparatus 20, typically, can be configured as an electronic control unit (ECU) including a central processing unit (CPU), a memory, an input-output interface and the like. The electronic control unit realizes functions as a determination unit 21 and/or an assist control unit 22 described later, when the CPU reads a predetermined program stored in the memory and executes the program.

Control by Driving Assist Apparatus

First Example

Figure 2:
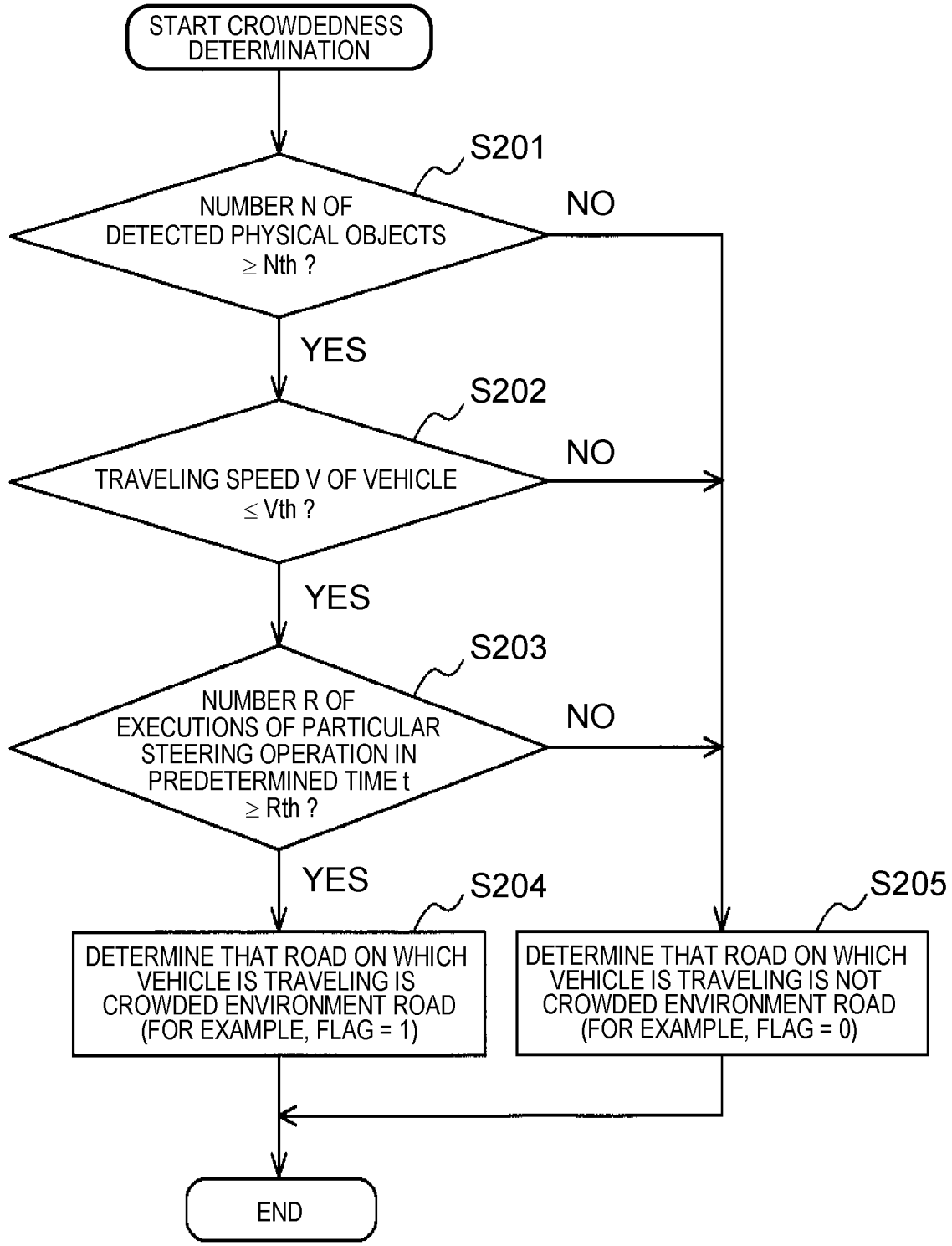
FIG. 2 is a flowchart for describing a first example of an assist control that is executed by the driving assist apparatus.

Next, a first example of the collision avoidance assist control that is executed by the driving assist apparatus 20 according to the embodiment of the disclosure will be described with reference to FIG. 2. FIG. 2 is a flowchart for describing a processing procedure of a crowdedness determination in the first example.

The first example shown in FIG. 2, which is executed by the determination unit 21 of the driving assist apparatus 20, is an example in which the collision avoidance is assisted by determining whether the road on which the vehicle is traveling is a crowded environment road. The crowdedness determination process is started, for example, by the start of the engine of the vehicle, and is repeatedly executed, for example, at a predetermined interval, until the engine is stopped.

Step S201: In this process, the number N of physical objects existing in the traveling direction of the vehicle is obtained based on the information about the physical objects detected by the external sensor 11. Then, it is determined whether the number N of the physical objects obtained is a predetermined number Nth or more (N≥Nth). That is, in the process of step S201, it is determined whether a first condition that a predetermined number Nth or more of physical objects are detected in the traveling direction of the vehicle is satisfied.

The predetermined number Nth can be arbitrarily set. For example, the predetermined number Nth may be a fixed value, or may be a value that varies depending on a traveling environment (for example, road width, time or weather) and the like that can be acquired from the interior or exterior of the vehicle.

When it is determined in step S201 that the first condition is satisfied (N≥Nth) (S201, Yes), the process proceeds to step S202. On the other hand, when it is determined that the first condition is not satisfied (N<Nth) (S201, No), the process proceeds to step S205.

Step S202: In this process, a traveling speed V of the vehicle is obtained based on the information about the vehicle detected by the wheel speed sensor 12, the acceleration sensor 13 and the like. Then, it is determined whether the obtained traveling speed V is the predetermined speed Vth or lower (V≤Vth). That is, in the process of step S202, it is determined whether a second condition that the vehicle travels at the predetermined speed Vth or lower is satisfied.

The predetermined speed Vth can be arbitrarily set. For example, the predetermined speed Vth may be the same value as a threshold value that is used for the determination of the activation of the collision avoidance assist by the driving assist apparatus 20, or may be a threshold value that is used only for the determination of whether the road on which the vehicle is traveling is a physical object crowded road in the first example.

When it is determined in step S202 that the second condition is satisfied (V≤Vth) (S202, Yes), the process proceeds to step S203. On the other hand, when it is determined that the second condition is not satisfied (V>Vth) (S202, No), the process proceeds to step S205.

Step S203: In this process, the number R of executions of a particular steering operation by the driver in a predetermined time is obtained based on the information about the vehicle detected by the steering angle sensor 14. Then, it is determined whether the number R of the steering operations obtained is a predetermined number Rth or more (R≥Rth).

For example, the number R of the steering operations is obtained as follows. First, a steering wheel turning operation from a left steered state to a right steered state or a steering wheel turning operation from the right steered state to the left steered state that is performed by the driver is detected. Next, a rotational angle D by which the steering wheel is rotated in the detected steering wheel turning operation is obtained. Then, when the rotational angle D of the steering wheel is a predetermined rotational angle Dth or more (D≥Dth), it is determined that the steering operation is the particular steering operation, and the information that the particular steering operation has been performed is stored in the memory (not illustrated) included in the driving assist apparatus 20 or the like, together with information of operation hour. In the process of step S203, by reference to the memory in which the above information is stored, the total number of executions of the particular steering operation in a period from the time point of a predetermined time t (for example, several tens of seconds) before the process to the time point of the process is calculated as the number R of the steering operations.

That is, in this example, it is determined in the process of step S203 whether a third condition that a predetermined number Rth or more of steering wheel turning operations by each of which the steering wheel is turned by the predetermined rotational angle Dth or more are performed in the predetermined time t is satisfied.

Each of the predetermined rotational angle Dth, the predetermined number Rth and the predetermined time t can be arbitrarily set. For example, each of the predetermined rotational angle Dth, the predetermined number Rth and the predetermined time t may be a fixed value, or may be a value that varies depending on a traveling environment (for example, road width, time or weather) and the like that can be acquired from the interior or exterior of the vehicle.

When it is determined in step S203 that the third condition is satisfied (R≥Rth) (S203, Yes), the process proceeds to step S204. On the other hand, when it is determined that the third condition is not satisfied (R<Rth) (S203, No), the process proceeds to step S205.

Step S204: In this process, since all of the above-described first condition, second condition and third condition are satisfied, it is determined that the road on which the vehicle is traveling is a road that is crowded with a plurality of physical objects, that is, a crowded environment road. After the determination, one flow of the crowdedness determination process is ended.

Step S205: In this process, since all of the above-described first condition, second condition and third condition are not satisfied, it is determined that the road on which the vehicle is traveling is not a road that is crowded with a plurality of physical objects, that is, is not a crowded environment road and but an ordinary road. After the determination, one flow of the crowdedness determination process is ended.

The above determination result can be utilized for the control of the vehicle, for example, by setting a previously decided crowded environment determination flag to "1" when the road on which the vehicle is traveling is a crowded environment road (step S204) and setting the crowded environment determination flag to "0" when the road on which the vehicle is traveling is not a crowded environment road (step S205).

After the determination is made in step S204 or step S205 and one flow is ended, step S201 is started again, for example, when a predetermined time has elapsed. The above-described process is repeatedly executed.

Thus, in the first example of the collision avoidance assist control, the three items having high associations with the crowded environment road, that is, the number N of physical objects existing in the traveling direction of the vehicle, the traveling speed V of the vehicle and the number R of steering wheel turning operations by the driver are all determined. Thereby, it is possible to accurately determine whether the road on which the vehicle is traveling is a crowded environment road.

Second Example

Figure 3:
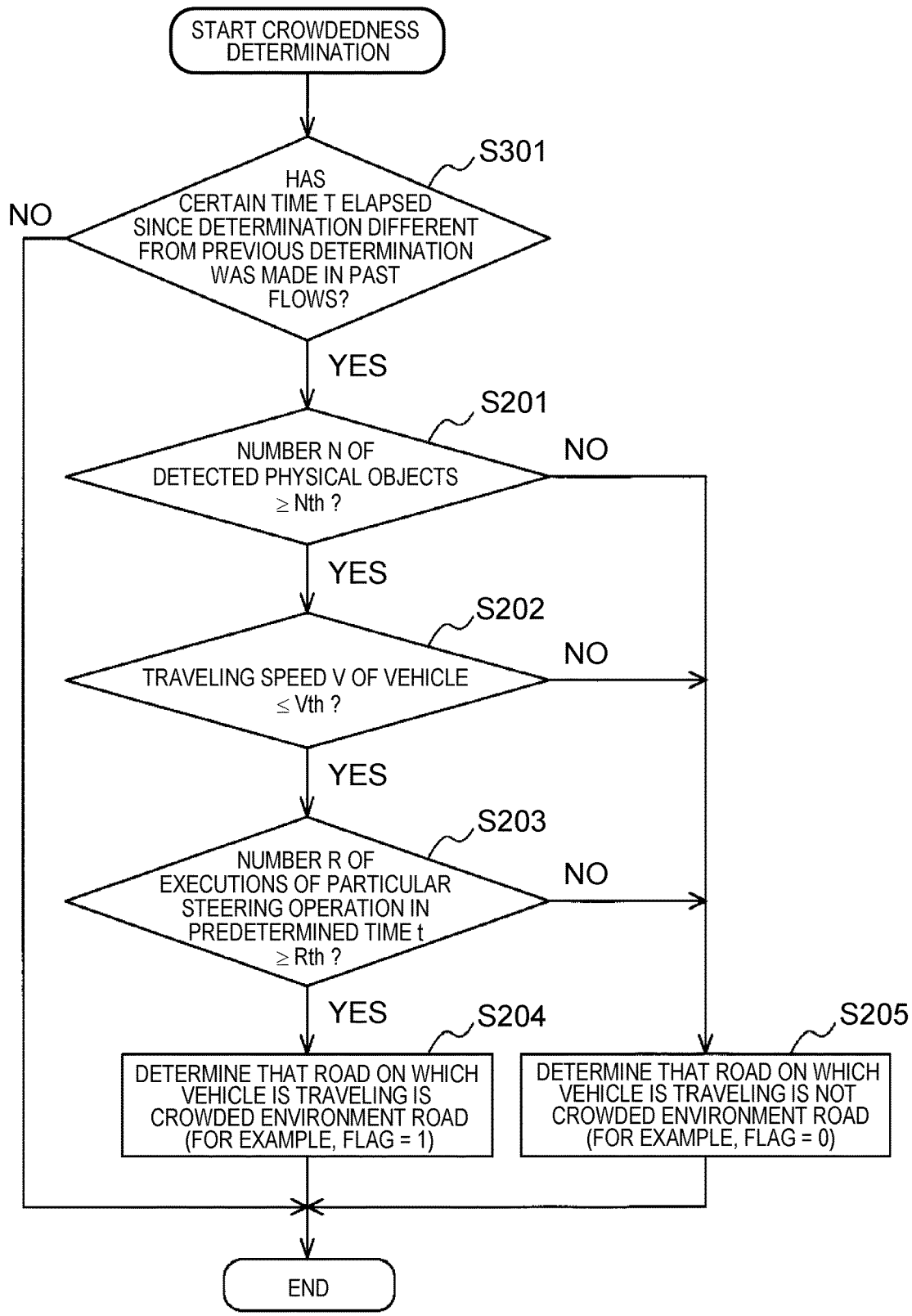
FIG. 3 is a flowchart for describing a second example of the assist control that is executed by the driving assist apparatus.

Next, a second example of the collision avoidance assist control that is executed by the driving assist apparatus 20 according to the embodiment to the disclosure will be described with reference to FIG. 3. FIG. 3 is a flowchart for describing a processing procedure of a crowdedness determination in the second example.

The second example shown in FIG. 3, which is executed by the determination unit 21 of the driving assist apparatus 20, is different from the above-described crowded determination process in the first example, in that step S301 is added. In the following, in the second example, the process of step S301, which is the difference, will be described. For the other processes, the same step numbers as those in the first example are assigned, and the description is omitted.

Step S301: In this process, it is determined whether a certain time T has elapsed since a determination different from the previous determination, as the determination of whether the road on which the vehicle is traveling is a crowded environment road, was made for the last time in flows executed in the past. The determination different from the previous determination means, in successive flows, the determination that the road on which the vehicle is traveling is not a crowded environment road (step S205) following the determination that the road on which the vehicle is traveling is a crowded environment road (step S204), or the determination that the road on which the vehicle is traveling is a crowded environment road (step S204) following the determination that the road on which the vehicle is traveling is not a crowded environment road (step S205).

For example, whether the certain time T has elapsed is determined as follows. When it is determined in step S204 that the road on which the vehicle is traveling is a crowded environment road or when it is determined in step S205 that the road on which the vehicle is traveling is not a crowded environment road, information of the determination, each time, is stored in the memory (not illustrated) included in the driving assist apparatus 20 or the like, together with information of hour. In the process of step S301, by reference to the memory in which the above information is stored, the time points when the determination different from the previous determination was made are specified, and it is determined whether the certain time T (for example, several seconds) has elapsed after the last time point when the determination different from the previous determination was made and before the current time point. The length of the certain time T can be arbitrarily set.

When it is determined in step S301 that the certain time T has elapsed (S301, Yes), the process proceeds to step S201. On the other hand, when it is determined that the certain time T has not elapsed (S301, No), one flow of the crowdedness determination process is ended.

Thus, in the second example of the collision avoidance assist control, after the change (the determination different from the previous determination) from one crowdedness determination to the other crowdedness determination is performed for the last time and before the certain time T elapses, the determination is prohibited from being changed to the one crowdedness determination again. Thereby, it is possible to avoid the determination from switching frequently in a shorter time than the certain time T, between the determination that the road on which the vehicle is traveling is a crowded environment road and the determination that the road on which the vehicle is traveling is not a crowded environment road.

Therefore, for example, it is possible to suppress such a control that the driving assist apparatus 20 instantaneously determines that the road on which the vehicle is traveling is not a crowded environment road when no pedestrian exists by chance even though the vehicle is traveling on a road that is crowded with a plurality of pedestrians.

Third Example

Figure 4:
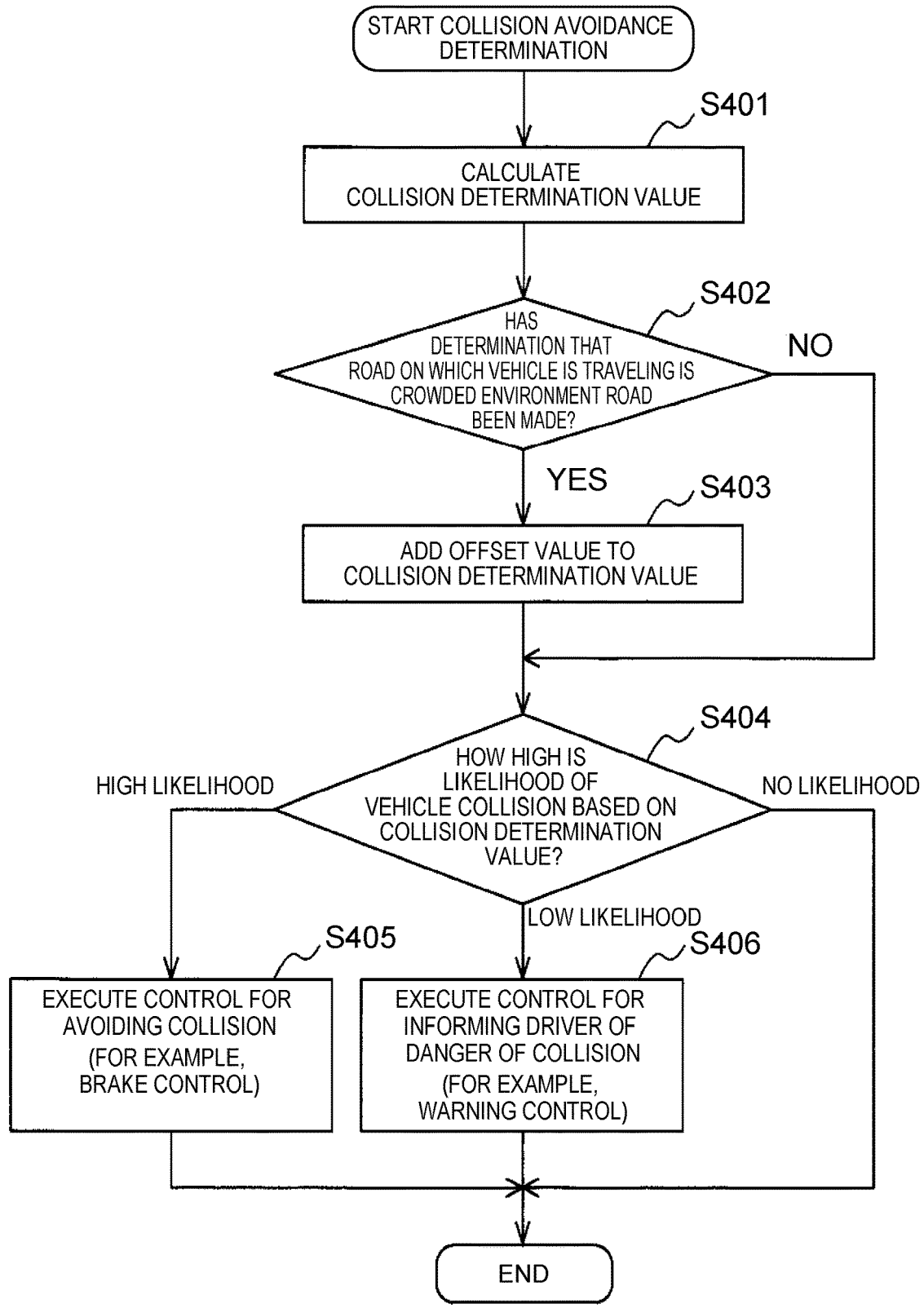
FIG. 4 is a flowchart for describing a third example of the assist control that is executed by the driving assist apparatus.
Figure 5:
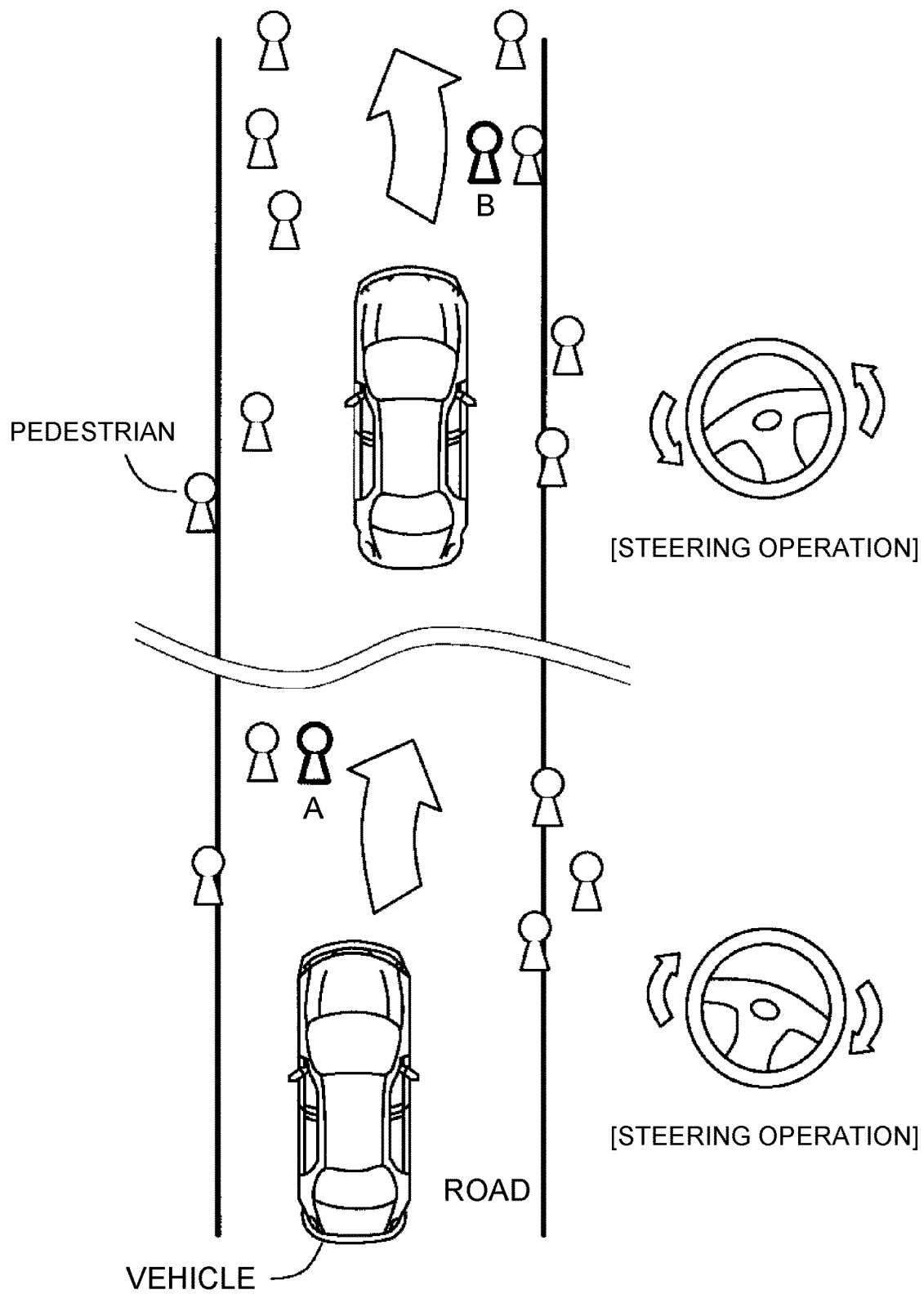
FIG. 5 is a diagram for describing an example of a crowded environment road.

Next, a third example of the collision avoidance assist control that is executed by the driving assist apparatus 20 according to the embodiment of the disclosure will be described with reference to FIG. 4. FIG. 4 is a flowchart for describing a process of the collision avoidance determination in the third example.

The third example, which is executed by the assist control unit 22 of the driving assist apparatus 20, is an example in which the result of the crowdedness determination in the above-described first example or second example is used for the collision avoidance determination. Typically, the flow shown in FIG. 4, together with the flow shown in FIG. 2 or FIG. 3, is started, for example, by the start of the engine of the vehicle, and is repeatedly executed, for example, at a predetermined interval, until the engine is stopped.

Step S401: In this process, a predetermined collision determination value C indicating a likelihood that the vehicle collides with a physical object is calculated based on the information about the vehicle, the information about the physical object and the like that are acquired from the wheel speed sensor 12, the acceleration sensor 13 and the steering angle sensor 14. As the collision determination value C, for example, a predicted time (TTC: Time To Collision) until the vehicle collides with the physical object, the relative distance between the vehicle and the physical object, or the like can be used. After the collision determination value C is calculated, the process proceeds to step S402.

Step S402: In this process, it is determined whether the determination that the road on which the vehicle is traveling is a crowded environment road has been made. Specifically, this determination is performed based on the result of the crowdedness determination executed by the process in the first example or the second example. For example, in the case where the result of whether the road on which the vehicle is traveling is a crowded environment road is indicated using the previously decided crowded environment determination flag, whether the road on which the vehicle is traveling is a crowded environment road can be easily determined by checking whether the flag has been set to "1".

When is determined in step S402 that the determination that the road on which the vehicle is traveling is a crowded environment road has been made (S402, Yes), the process proceeds to step S403. On the other hand, when it is determined that the determination that the road on which the vehicle is traveling is not a crowded environment road has been made (S402, No), the process proceeds to step S404.

Step S403: In this process, a predetermined offset value is added to the collision determination value C calculated in step S401. For example, when the collision determination value C is the time until the vehicle collides with the physical object, the offset value is set to a value of the time, and when the collision determination value C is the relative distance between the vehicle and the physical object, the offset value is set to a value of the distance. After the offset value is added to the collision determination value C, the process proceeds to step S404.

Step S404: In this process, the likelihood that the vehicle collides with the physical object is determined based on the collision determination value C. This determination can be performed, for example, based on the result of the comparison of the collision determination value C with a predetermined reference value Cth. The predetermined reference value Cth can be arbitrarily set.

For example, when the collision determination value C is a reference value Cth1 or less and is a reference value Cth2 or less (C≤Cth1, C≤Cth2), it may be determined that the likelihood of the collision is high. Further, when the collision determination value C is the reference value Cth1 or less and is exceeding the reference value Cth2 (C≤Cth1, C>Cth2), it may be determined that the likelihood of the collision is low. Furthermore, when the collision determination value C is exceeding the reference value Cth1 and is exceeding the reference value Cth2 (C>Cth1, C>Cth2), it may be determined that there is almost no likelihood of the collision.

A specific example will be described. For example, suppose that the collision determination value C=15 is obtained as the calculation result in the case of the reference value Cth1=20, the reference value Cth2=10 and the offset value=10. Here, when the road on which the vehicle is traveling is not a crowded environment road, it is determined that the likelihood of the collision is low, in accordance with the determination of Cth1>C>Cth2. On the other hand, when the road on which the vehicle is traveling is a crowded environment road, it is determined that there is almost no likelihood of the collision, in accordance with the determination of C+10>Cth1 and C+10>Cth2.

When it is determined in step S404 that the likelihood of the collision is high (S404, HIGH LIKELIHOOD), the process proceeds to step S405. When it is determined that the likelihood of the collision is low (S404, LOW LIKELIHOOD), the process proceeds to step S406. When it is determined that there is almost no likelihood of the collision (S404, NO LIKELIHOOD), one flow of the collision avoidance determination process is ended.

Step S405: In this process, a driving assist control for avoiding the collision is activated in response to the determination that the likelihood of the collision is high. For example, the driving assist control is a control of automatically giving a braking force to wheels of the vehicle through the brake control unit 34, regardless of the brake operation by the driver. After the driving assist control for avoiding the collision is activated, one flow of the collision avoidance determination process is ended.

Step S406; In this process, a driving assist control for informing the driver of a danger of the collision is activated in response to the determination that the likelihood of the collision is low and the collision avoidance action does not need to be activated. For example, the driving assist control is a control of displaying a collision prediction warning on a display device such as a meter panel through the HMI control unit 31. After the driving assist control for informing the driver or the like of the danger of the collision is activated, one flow of the collision avoidance determination process is ended.

After one flow is ended based on the determination in step S405 or S406 or the determination that there is almost no likelihood of the collision in step S404, step S401 is started again, for example, when a predetermined time has elapsed. The above-described process is repeatedly executed.

Thus, in the third example of the collision avoidance assist control, when it is determined that the road on which the vehicle is traveling is a crowded environment road, the offset value is added to the collision determination value C indicating the likelihood that the vehicle collides with the physical object. Thereby, when it is determined that the road on which the vehicle is traveling is a crowded environment road, it is harder to activate the driving assist control than when it is determined that the road on which the vehicle is traveling is not a crowded environment road.

The disclosure has been described above, in detail. The above description is an example in all respects, and does not limit the scope of the disclosure. The disclosure can be carried out as various modifications of the above-described embodiment. For example, in the first example and the second example, the determinations of satisfaction of the first condition, the second condition and the third condition may be performed in a different order from the order shown in FIG. 2 and FIG. 3. In the above-described embodiment, for determining whether the road on which the vehicle is traveling is a crowded environment road, another condition may be used in addition to the first condition, the second condition and the third condition. Needless to say, various improvements and modifications can be made without departing from the spirit of the disclosure.

The driving assist apparatus in the disclosure can be used for vehicles and the like, and is useful, for example, in the case of determining whether the road on which the vehicle is traveling is a road that is crowded with a plurality of physical objects.

What is claimed is:

1. A driving assist apparatus comprising at least one electronic control unit configured to:
    detect a first object existing in a traveling direction of a vehicle and assist a collision avoidance between the vehicle and the first object;
    determine whether a first condition is satisfied, the first condition being a condition that a predetermined number or more of physical objects are detected;
    determine whether a second condition is satisfied, the second condition being a condition that the vehicle travels at a predetermined speed or lower;
    determine whether a third condition is satisfied, the third condition being a condition that a predetermined number or more of turning operations of a steering wheel of the vehicle are performed by a driver of the vehicle in a predetermined time, each of the turning operations of the steering wheel of the vehicle being a turning operation by which the steering wheel is turned by a predetermined rotational angle or more; and
    determine that a road on which the vehicle is traveling is a crowded environment road, based on a determination that all of the first condition, the second condition, and the third condition are satisfied, the crowded environment road being a road crowded with the physical objects.

2. The driving assist apparatus according to claim 1, wherein
    the at least one electronic control unit is configured to repeatedly execute, at a predetermined interval, the determination of whether the road on which the vehicle is traveling is the crowded environment road, and not to execute the determination until a certain time elapses after a determination different from a previous determination is made.

3. The driving assist apparatus according to claim 1, wherein
    the at least one electronic control unit is configured to control, when the at least one electronic control unit determines that the road on which the vehicle is traveling is the crowded environment road, the driving assist apparatus such that it is harder to activate assist of the collision avoidance than when the at least one electronic control unit determines that the road on which the vehicle is traveling is not the crowded environment road.

4. The driving assist apparatus according to claim 3, wherein
    the at least one electronic control unit is configured to
        predict a collision time until the vehicle collides with the first object,
        activate the assist of the collision avoidance when the collision time is a predetermined reference value or less, and
        add, when the at least one electronic control unit determines that the road on which the vehicle is traveling is the crowded environment road, a predetermined offset time to the collision time.

5. The driving assist apparatus according to claim 3, wherein
    the at least one electronic control unit is configured to
        measure a relative distance between the vehicle and the first object,
        activate the assist of the collision avoidance when the relative distance is a predetermined reference value or less, and
        add, when the at least one electronic control unit determines that the road on which the vehicle is traveling is the crowded environment road, a predetermined offset distance to the relative distance.

6. The driving assist apparatus according to claim 1, wherein
    the physical objects exist (i) in the traveling direction of the vehicle or in a periphery of the vehicle; and (ii) on the road on which the vehicle is traveling.

7. A driving assist system comprising at least one electronic control unit configured to:
    detect a first physical object existing in a traveling direction of a vehicle;
    assist a collision avoidance between the vehicle and the first physical object;
    determine whether a first condition is satisfied, the first condition being a condition that a total number of (i) the detected first physical object and (ii) detected second physical objects is a predetermined number or more, the second physical objects existing in the traveling direction of the vehicle or in a periphery of the vehicle;
    determine whether a second condition is satisfied, the second condition being a condition that the vehicle travels at a predetermined speed or lower;
    determine whether a third condition is satisfied, the third condition being a condition that a predetermined number or more of turning operations of a steering wheel of the vehicle are performed by a driver of the vehicle in a predetermined time, each of the turning operations of the steering wheel of the vehicle being a turning operation by which the steering wheel is turned by a predetermined rotational angle or more;
    determine that a road on which the vehicle is traveling is a crowded environment road, when the at least one electronic control unit determines that at least all of the first condition, the second condition, and the third condition are satisfied, the crowded environment road being a road crowded with the second physical objects;

activate assist of the collision avoidance by using a brake apparatus included in the vehicle; and perform a control of the vehicle such that when the at least one electronic control unit determines that the road on which the vehicle is traveling is the crowded environment road, it is harder to activate the assist of the collision avoidance than when the at least one electronic control unit determines that the road on which the vehicle is traveling is not the crowded environment road.

* * * * *